H. J. GILBERT.
PULEY.
APPLICATION FILED MAY 23, 1904.
1,062,825.
Patented May 27, 1913.
2 SHEETS—SHEET 1.
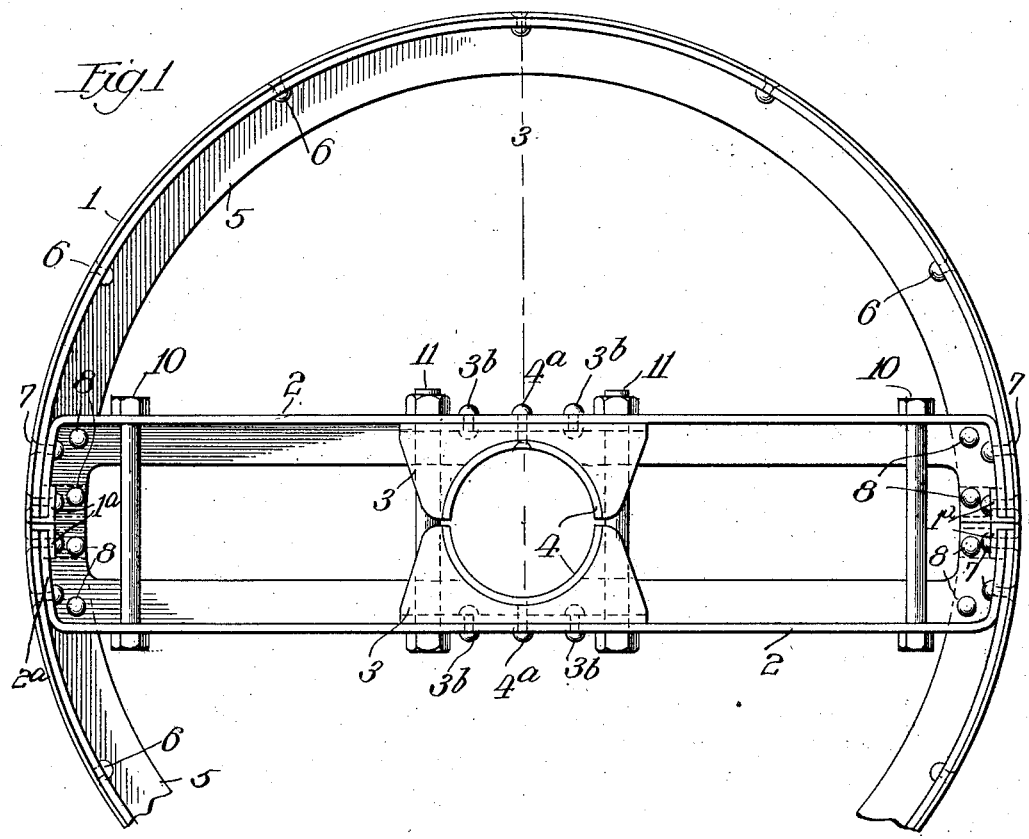
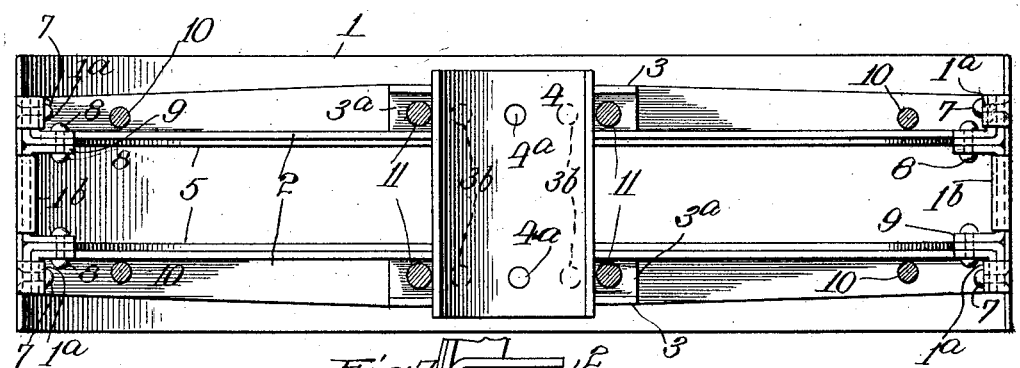
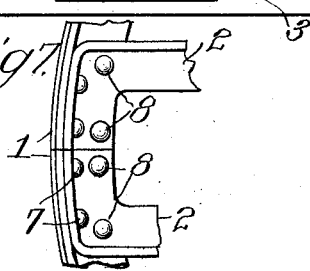
Witnesses:
Edw. R. Barrett
Louis B. Erwin
Inventor
H. J. Gilbert
By Rector & Hibben
His Att'ys

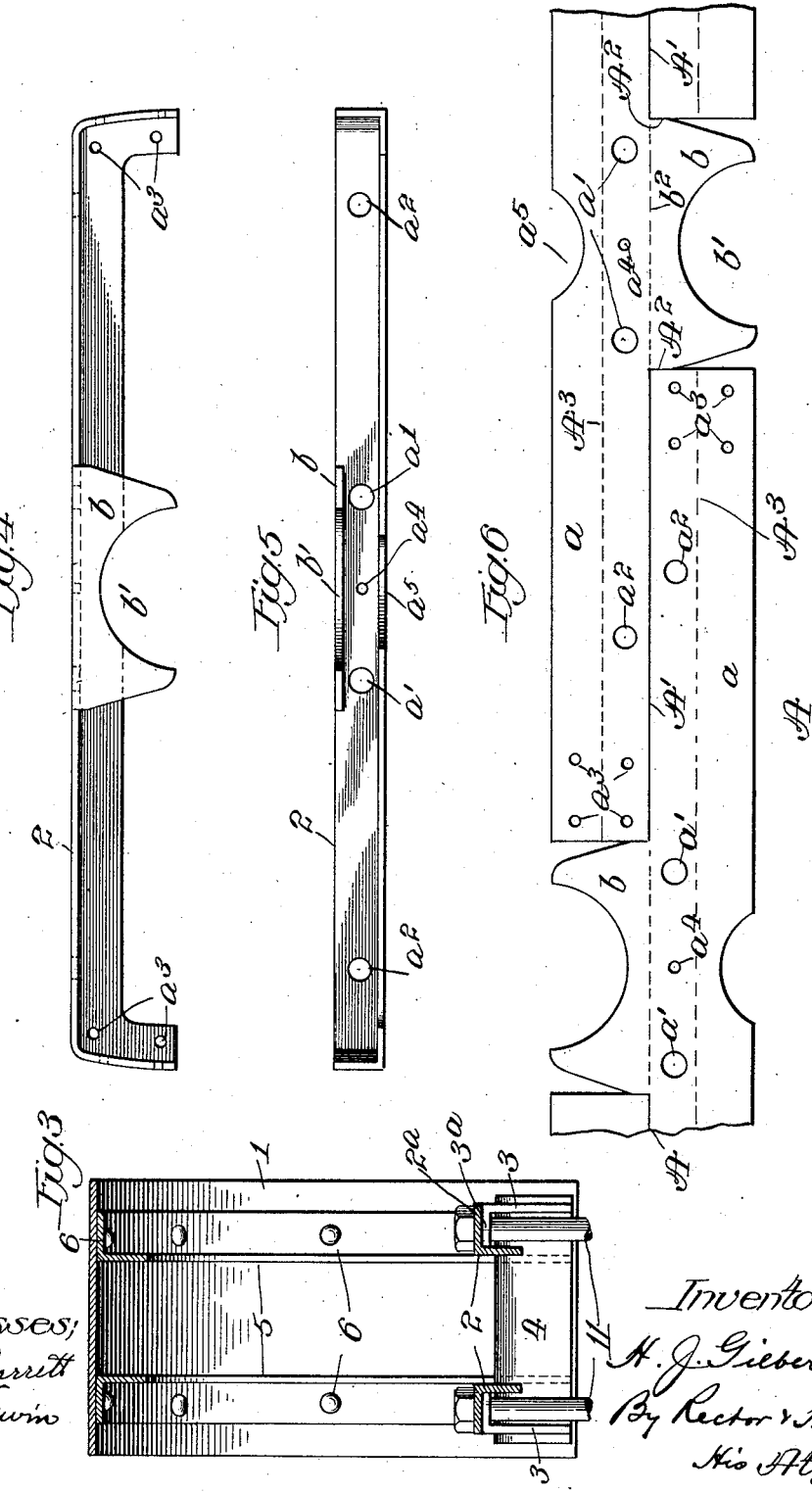

UNITED STATES PATENT OFFICE.

HENRY J. GILBERT, OF SAGINAW, MICHIGAN.

PULLEY.

1,062,825.  Specification of Letters Patent.  Patented May 27, 1913.

Application filed May 23, 1904. Serial No. 209,334.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention has relation to pulleys, more particularly to those of the split type, and the object thereof is to produce, from sheet and commercial forms of iron, a simple, efficient and durable as well as a comparatively inexpensive pulley, as will be made apparent from the description hereinafter given.

In the drawings Figure 1 is a side elevation of a pulley embodying my invention; Fig. 2 is a sectional plan of the lower half of the pulley illustrated in Fig. 1; Fig. 3 a section on line 3 of Fig. 1; Figs. 4, 5 and 6 detail views showing the steps in the process of making or forming the spoke arms from the blank, but in the present instance illustrating a spoke arm with an integral hub section, and Fig. 7 a detail view of a modification.

Referring to Figs. 1, 2 and 3, the pulley comprises essentially the two rim segments 1, parallel spoke arms 2 extending across the pulley on either side of its center and parallel to a diameter extending through the division line of the segments, and hub sections 3, together with a split hub thimble 4, if desired.

In the present instance each rim segment has secured to its interior face one or more angle irons 5, to which the spoke arms, hereinafter described, are connected at their outer ends. The number of these angle irons 5 is optional, depending upon the number of sets of spoke arms employed and upon the desired strength to be imparted to the rim and the width of the pulley. In the present instance, however, I have shown two sets of these spoke arms and a corresponding pair of these angle irons to which the spoke arms are connected. These angle irons may be secured to the rim segments in any suitable manner, as by the rivets 6, and their ends may be interlocked with the inturned or infolded ends of the segments, in a manner hereinafter explained.

Each spoke arm 2 consists of an angle iron composed solely of two members or flanges, extending in a straight line across the pulley on a line parallel to the plane of division of the pulley halves with one of its flanges inwardly directed and its other flange on a plane parallel to such division plane. The ends of each spoke arm are bent substantially at right angles as indicated in Fig. 1, but with the outer flange $2^a$ slightly curving to correspond to the curvature of the inner face of the rim segment and riveted thereto by rivets 7. The inner flange at each end of the spoke arm rests against one side or face of its angle iron, to which it is secured in suitable manner, as by means of the rivets 8. The inwardly directed flange of each spoke arm is recessed on its edge at its center to fit upon the hub thimble as shown in Fig. 3.

By preference, the extreme ends of the spoke arms as well as the angle irons 5 are interlocked with the meeting ends of the rim segments, and for this purpose, each of these ends of the segments has a pair of outer tongues $1^a$ and a middle tongue $1^b$, as clearly shown in Figs. 1 and 2. These tongues $1^a$ are folded inwardly and then reversely so as to fit over upon that flange of the angle irons 5 which is secured to the rim and also over upon the flange $2^a$ of the spoke arm. These tongues thus form a pocket or socket receiving these angle irons. The rivets 7 are passed through all the parts and thereby serve to secure them firmly together.

In order to strengthen and brace the center of the rim as well as the angle irons 5 and spoke arms 2, I prefer to provide, at the opposite ends of each rim segment, a strengthening plate 9 (Fig. 2), which comprises a U-shaped strip, with its body portion bearing against the rim and its right-angled ends bearing against the angle irons 5 and secured thereto by the same rivets 8 which serve to secure the spoke arms thereto, as already described. In the present instance there are four of these strengthening plates, two at each of the meeting ends of the rim segments.

Still referring to the construction of pulley of Figs. 1, 2 and 3, the hub section of each spoke arm comprises a plate 3 at right angles to the axis of rotation and having a recess somewhat less than a semi-circle so as to fit upon its half thimble 4. This hub plate has a horizontal flange $3^a$ bearing against the under or inner face of the top or horizontal flange of the spoke arm and riveted thereto by rivets $3^b$ as clearly illustrated in Fig. 1. Each half thimble is held to its hub section by means of a rivet 4ᵃ. The pulley halves are secured or clamped together by the outer pairs of clamping bolts 10 passing through the spoke arms near their outer ends and by the inner pairs of clamping bolts 11 passing through the said hub sections of both pulley halves as well as the spoke arms. However, in small diameter pulleys the clamping bolts 10 may be dispensed with.

Figs. 4, 5 and 6 of the drawings illustrate the method of forming the spoke arms from a blank and at the same time serve to illustrate a modified form of construction in which the hub section and the spoke arm, instead of being formed of separate pieces riveted together, are formed integral, the same being in fact cut from the same sheet or blank of metal. Referring first to Fig. 6, the spoke arms and hub sections are cut from a blank A, without any substantial waste of material, the material of the spoke arms $a\ a$ overlapping in the blank and the hub plates $b$ being cut from the sides of the blank alternately. The spoke arms have holes $a'$ punched to receive the inner clamping bolts 11 and holes $a^2$ to receive the outer clamping bolts 10. Rivet holes $a^3$ are also punched in the ends of the spoke arms to receive the rivets 7 and 8, and likewise a hole $a^4$ for the rivets 4ᵃ. The hub portion $b$ has a semi-circular recess $b'$ to fit the hub thimble and the spoke arm has a circular recess $a^5$ on the opposite side for the same purpose. The blank is cut along the middle line $A'$ and at $A^2$ whereby the separate spoke arms are formed. Each spoke arm is folded centrally along the line $A^3$ to form the angle iron with its right-angled flanges, the opposite ends of which are bent at substantially right angles as indicated in Fig. 4. The hub plate $b$ is bent or folded at right angles to the flange to which it is joined, along the line $b^2$, whereupon there results the spoke arm illustrated in Fig. 4.

It will be understood that while I prefer to provide for the interlocking of parts as hereinbefore described, such interlocking is not essential to my invention in its broad aspect and not required in any of the claims except when specifically called for. In fact, my novel form of spoke arms may be employed in a pulley without such interlocking, as indicated in Fig. 7, where the meeting ends of the rim segments abut each other.

So far as the broad feature or idea of my invention is concerned it is immaterial whether the hub sections are integral with or separate from the spoke arms and my broader claims are therefore to be interpreted with that understanding.

A pulley constructed in the manner hereinbefore described possesses the advantageous features of rigidity and durability, as well as extreme strength, although comparatively light in weight.

I claim:

1. A pulley comprising rim segments, spoke arms consisting of angle irons composed solely of two flanges connected at their ends with the rim segments, one flange of each of such angle irons being inwardly directed and the other one parallel to the plane of division between the pulley halves and extending in a straight line across the pulley, and a hub at the middle portion of the spoke arms consisting of similar but separate sections of angle irons reversely arranged with respect to the spoke arms, each hub angle iron having a flange secured to the said parallel flange of its spoke arm and of the same width as such latter flange and another flange directed radially; substantially as described.

2. A pulley comprising rim segments, spoke arms extending in a straight line across the pulley and consisting of angle irons composed solely of two flanges connected at their ends with the rim segments, and a hub thimble connected with the spoke arms, one of the flanges of the angle irons being recessed to fit upon the hub thimble; substantially as described.

3. A pulley comprising rim segments, angle irons secured to the inner face thereof, spoke arms consisting of angle irons having radially inwardly directed flanges secured to the corresponding flanges of the other angle irons and having hub sections at an angle to the other set of their flanges and parallel to said inwardly directed flanges, and a hub thimble, one flange of each spoke arm being recessed to fit upon the hub thimble; substantially as described.

4. A pulley comprising rim segments, angle irons secured to the inner face thereof, spoke arms consisting of angle irons having radially inwardly directed flanges secured to the corresponding flanges of the other angle irons and having hub sections at an angle to the other set of their flanges and parallel to said inwardly directed flanges, and a hub thimble, said hub sections and also one inwardly directed flange of each spoke arm being recessed to fit upon the hub thimble; substantially as described.

5. A pulley comprising rim segments, angle irons secured to the inner face thereof, and spoke arms consisting of angle irons, said angle irons and spoke arms being together interlocked with the rim segments; substantially as described.

6. A pulley comprising rim segments and spoke arms consisting of a pair of parallel angle irons having inwardly directed flanges and also flanges at right angles thereto and interlocked at their ends with the segments, and a hub structure comprising a pair of angle irons having flanges fitting flatly against and secured to the central portion of the spoke arms as to their entire width and disposed reversely thereto; substantially as described.

7. A pulley comprising rim segments and spoke arms consisting of a pair of parallel angle irons having inwardly directed flanges and also flanges at right angles thereto and interlocked at their ends with the segments, and a hub structure comprising a pair of angle irons having flanges fitting flatly against and secured to the central portion of the spoke arms as to their entire width and disposed reversely thereto, one of the flanges of each hub angle iron being inwardly extended and also recessed to form the shaft opening; substantially as described.

8 A. pulley comprising rim segments, spoke arms consisting of angle irons composed solely of two flanges connected at their ends with said segments, and extending in a straight line across the pulley, a hub thimble, one of the flanges of such angle irons being inwardly directed and recessed to fit such thimble, and hub sections carried by said spoke arms; substantially as described.

9. A pulley comprising rim segments, spoke arms consisting of angle irons composed solely of two flanges connected at their ends with said segments, and extending in a straight line across the pulley, a hub thimble, one of the flanges of such angle irons being inwardly directed and recessed to fit such thimble, and hub sections carried by said spoke arms and consisting of plates extending therefrom parallel to said inwardly directed flange and fitting upon said thimble; substantially as described.

10. A pulley comprising rim segments, angle irons arranged on the inner face of such segments, and spoke arms consisting of angle irons whose flanges are connected at their outer ends with the corresponding flanges of the first named angle irons, the meeting ends of said segments having inturned tongues forming recesses or sockets to receive the ends of the angle irons of the segments and the spoke arms; substantially as described.

11. A pulley comprising rim segments, a pair of angle irons arranged on the inner face of such segments, spoke arms connected at their ends with such angle irons, and strengthening plates arranged between such angle irons; and interlocked with a rim segment substantially as described.

12. A pulley comprising rim segments, a pair of angle irons arranged on the inner face of such segments, spoke arms connected at their ends with such angle irons, and strengthening plates consisting of U-shaped strips arranged between such angle irons and secured thereto; substantially as described.

13. A pulley comprising rim segments, a pair of angle irons arranged on the inner face of such segments, spoke arms connected at their ends with such angle irons, and strengthening plates consisting of U-shaped strips arranged between such angle irons and secured thereto, the meeting ends of such segments having inturned tongues folded over and interlocking with said strengthening plate; substantially as described.

14. A pulley comprising rim segments, a pair of angle irons arranged on the inner face of such segments, spoke arms connected at their ends with such angle irons, and strengthening plates arranged at the opposite ends of the rim segments and consisting of U-shaped strips arranged between such angle irons with their body portion interlocked with the meeting ends of the rim segments and with their flanges secured to the flanges of the angle irons; substantially as described.

15. A pulley comprising rim segments having the inturned tongues $1^a$ forming sockets, a pair of angle irons arranged on the inner face of such segments and having their flanges received by said sockets, and spoke arms consisting of angle irons whose flanges are also received at their ends by said sockets, the spoke arms being connected with the angle irons of the segments independently of the sockets; substantially as described.

16. A pulley comprising rim segments having the inturned tongues $1^a$ forming sockets, a pair of angle irons arranged on the inner face of such segments, and having their flanges received by said sockets, and spoke arms consisting of angle irons whose flanges are also received at their ends by said sockets, the adjacent flanges of the angle irons of the spoke arms and of the rim segments being connected together, and rivets or the like passing through the said sockets and engaging said flanges received thereby; substantially as described.

17. A pulley comprising rim segments having the inturned tongues $1^a$ and intermediate tongue $1^b$ forming sockets, a pair of angle irons arranged on the inner face of such segments, spoke arms consisting of angle irons whose flanges together with the flanges of the angle irons of the rim segments are received within the sockets formed by the tongues $1^a$, and U-shaped strengthening plates arranged between the spoke arms and received by the sockets formed by the tongues $1^b$; substantially as described.

18. A pulley comprising rim segments having the inturned tongues $1^a$ and intermediate tongue $1^b$ forming sockets, a pair of angle irons arranged on the inner face of such segments, spoke arms consisting of angle irons whose flanges together with the flanges of the angle irons of the rim segments are received within the sockets formed by the tongues $1^a$, and U-shaped straightening plates arranged between the spoke arms and received by the sockets formed by the tongue $1^b$, rivets 7 passed through the sockets formed by the tongues $1^a$, thereby engaging and securing the flanges received therein, and rivets 8 passed through the adjacent flanges of the angle irons of the segments and of the spoke arms and also through the said plates; substantially as described.

19. A pulley comprising rim segments having inturned tongues forming sockets, angle irons arranged on the inner face thereof, spoke arms consisting of angle irons whose flanges together with those of the other angle irons are received within said sockets, and means for securing said flanges in place therein, substantially as described.

HENRY J. GILBERT.

Witnesses:
S. E. HIBBEN,
LOUIS B. ERWIN.

Copies of this patent may be obtained for five cents each, by addressing the "Commissioner of Patents, Washington, D. C."